3,117,058
SNAKE TOXICANT
James R. Jenni, 30 NE. 14th St., Oklahoma City, Okla.
No Drawing. Filed Mar. 13, 1961, Ser. No. 94,997
2 Claims. (Cl. 167—46)

This invention relates to new and novel compositions which are particularly suitable for killing cold-blooded animals, such as snakes and the like. More specifically, the invention is concerned with compositions of the foregoing type containing an O,O-dialkyldithiophosphate of a polyalkylmercaptosuccinate.

Heretofore various attempts have been made to free a given area of snakes. Some of these methods have been based mainly on superstition, while others have depended upon the actual extermination of the snakes in the area concerned. To the best of my knowledge, however, none of these proposed methods have been entirely satisfactory. Perhaps the most successful of these proposed methods are those employing a toxic substance capable of killing snakes. A disadvantage in employing such substances as heretofore practiced is that if a sufficient quantity of the toxic material were used to kill snakes the concentration of the toxic material would be sufficient to present a definite hazard to warm-blooded animals.

It is, therefore, a principal object of the present invention to provide a toxicant composition for use against cold-blooded animals which obviates the disadvantages of the prior art compositions.

It is another object of my invention to provide a composition that will act as a contact poison for cold-blooded animals.

It is another object of my invention to provide a toxicant composition for cold-blooded animals that is non-toxic to warm-blooded animals.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the formulation of a toxicant composition comprising a liquid hydrocarbon, an O,O-dialkyldithiophosphate of a polyalkylmercaptosuccinate and an emulsifying agent. The foregoing composition may be admixed with water and used as a spray or it may be mixed with a adsorbed by finely divided solid materials and used as a dusting composition.

Before proceeding with specific examples illustrating my invention, it may be well to indicate in general the nature of the materials and conditions required in the process.

Suitable hydrocarbons that may be used in my compositions including both aliphatic and aromatic hydrocarbons are those that have a boiling range above that of gasoline and below the boiling range of hydrocarbons of a lubricating oil grade. The latter limit may also be stated as a hydrocarbon having a viscosity of less than about 50 Saybolt seconds at 100° F. Specific hydrocarbons that are particularly suitable include kerosene, diesel oils, toluene and xylene. I wish to point out, however, that my invention is by no means limited to those specific hydrocarbons.

O,O-dialkyldithiophosphates of di- and trialkylmercaptosuccinates that may be used include those wherein the alkyl groups attached to the phosphate and to the succinate may contain from 1 to 5 carbon atoms. Preferred compounds are those in which the alkyl groups contain from 1 to 2 carbon atoms. Specific compounds which I have found particularly effective include O,O-dimethyldithiophosphate of diethylmercaptosuccinate and O,O-diethyldithiophosphate of diethylmercaptosuccinate.

Suitable emulsifying or surface active agents that may be used include both ionic and nonionic emulsifiers and are those which have the property of rendering the oil readily dispersible or emulsifiable with water. Such emulsifiers are listed in any standard text on this subject. As for example, reference is made to the series of papers by John W. McCutscheon which appeared in the December 1957, January, February, March and April, 1958 issues of Soap and Chemical Specialties. A few examples of such agents include the alkali metal alkyl aryl sulfonates wherein the alkyl group contains from 1 to 12 carbon atoms and the alkali metal alkyl sulfates wherein the alkyl group contains from 2 to 14 carbon atoms. Other emulsifiers include naphthenic acid soaps, such as those derived from petroleum crudes containing naphthenic acids, sulfonated naphthenic acids such as those obtained by treating naphthenic base oils with strong or fuming sulfuric acid followed by the recovery from the oil the resulting mixture of organic acids, also the ordinary fatty acid soaps of fatty acids with suitable metals, preferably sodium, potassium and ammonium soaps, and also soaps of wax acids, i.e., acids obtained by the limited oxidation of paraffin wax at low temperatures. A particularly suitable emulsifier, because it is available in large quantities and at an economical price, is the product known as sodium dodecylbenzene sulfonate. This particular product is described in U.S. Patent 2,779,735 dated April 18, 1956.

Suitable and preferred quantities of the O,O-dialkyldithiophosphate of a di- or trialkylmercaptosuccinate by weight based upon the weight of the total composition vary from 10 to 30% and 17.5 to 22.5% respectively. Somewhat even more preferably I use about 20% of this compound. A greater quantity than 30% may be used if desired but is generally not desirable as the cost of the product is increased greatly without a corresponding increase in the effectiveness of the final product.

As to the amount of emulsifier used, that will vary depending upon its effectiveness in emulsifying the hydrocarbon in water. For most emulsifying agents, the amount may vary from about 5 to 25 weight percent based on the total weight of the composition. In general I prefer to employ about 17.5 to 22.5% by weight of the emulsifier. An even more preferred quantity is about 20 percent.

After the desired quantities of the two components listed above are taken, a sufficient amount of the hydrocarbon is added to make 100%. In other words, depending upon the quantities of the ester and the emulsifier used, the amount of the hydrocarbon may vary from 45 to 85% by weight based upon the total weight of the composition.

As pointed out above, the composition of my invention may be admixed with water and the resulting emulsion applied as a spray. In general this is the preferred method of application. The relative amount of water compared to that of the toxicant composition will vary depending upon the specific quantities of the various components making up the toxicant composition. When the composition contains the preferred quantities of the various components a suitable amount of water to be admixed with one quart of the toxicant composition varies from 5 to 15 gallons. Generally, I prefer to use about 10 gallons of water under such conditions and when so used the resulting emulsion is sufficient to spray an area of about 25,000 square feet. Greater or lesser quantities of the ester will require greater or lesser quantities of water.

When it is desired to employ the composition as a dusting toxicant it may be mixed with or adsorbed by finely divided solid materials, such as wood flour, talc, clay, bentonite, sulfur and carbon black.

In order to disclose the nature of the present invention still more clearly, the following illustrative examples will be given. It is to be understood that the invention is not be limited to the specific conditions or details set forth in these examples except insofar as such limitations are specified in the appended claims.

*Example I.*—A snake infested area located at an airbase in Texas was used to determine the effectiveness of my snake toxicant composition. Pertinent details of the test were as follows: an inspection of the area concerned disclosed a total of 7 rattlesnake dens and over a period of six days prior to the test 44 rattlesnakes were killed in that particular area. One quart of my toxicant composition containing on a volume basis: 20 percent O,O-dimethyldithiophosphate of diethylmercaptosuccinate, 20 percent of (50 percent active) sodium dodecylbenzene sulfonate was admixed with 10 gallons of water. The resulting mixture was used to spray the snake infested area which contained approximately 20,000 square feet. During the ensuing 3 days 240 rattlesnakes, 7 copperheads and 1 coral snake all dead were picked up in the area. A conservative estimate as to the total kill would be between 200 and 400 additional snakes.

Further proof of the effectiveness of my snake toxicant composition is apparent from the fact that over the 6 month's period following the spraying of the area only 7 live snakes were found in that area.

*Example II.*—A newly developed housing site containing approximately 80,000 square feet near Tulsa, Oklahoma, diclosed the presence of 1 copperhead den. The area was sprayed with the same quantity of the toxicant as used in Example I. After spraying no snakes were found in the sprayed area over a period of 10 months.

It is also contemplated that the toxicant composition may be put up in an aerosol can. When this modification is used the concentrations of the O,O-dialkyldithiophosphate of a di- or trialkylmercaptosuccinate and of the emulsifier may be decreased a great deal as compared to the amount of hydrocarbon. When this method is used, the solution is placed in a pressure tight container and a volatile propellant in the liquid phase is used to produce the necessary pressure to eject the solution from the can. As is well known to those skilled in the art, a halogenated alkane may be used as the propellant. For further information on the use of such liquid propellants and the use of aerosol pressure vessels in general, reference is made to any of the U.S. patents on this subject. A specific reference is U.S. Patent 2,655,480 dated October 13, 1953.

Extensive tests employing my toxicant compositions in the concentrations as defined above have shown them not only to be toxic to snakes and other cold-blooded animals, but are harmless to warm-blooded animals. This is obviously a very desirable feature.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The method of reducing the snake population of a snake infested area which comprises treating said area with a composition comprising a liquid hydrocarbon having a boiling range above the boiling range of gasoline and below the boiling range of lubricating oil hydrocarbons, and O,O-dialkyldithiophosphate of a polyalkylmercaptosuccinate wherein the alkyl groups contain from 1 to 5 carbon atoms and an emulsifying agent.

2. The method of reducing the snake population of a snake infested area which comprises treating each 25,000 square feet of said area with a mixture of from 5 to 15 gallons of water with one quart of a snake toxicant composition comprising 55 to 65% by weight of a liquid hydrocarbon having a boiling range above the boiling range of gasoline and below the boiling range of lubricating oil hydrocarbons, 17.5 to 22.5% by weight of an O,O-dialkyldithiophosphate of a polyalkylmercaptosuccinate wherein the alkyl groups contain from 1 to 5 carbon atoms and 17.5 and 22.5% of an emulsifying agent.

References Cited in the file of this patent
UNITED STATES PATENTS

| | | |
|---|---|---|
| 2,713,018 | Johnson | July 12, 1955 |
| 2,920,993 | Fairchild | Jan. 12, 1960 |

OTHER REFERENCES

Agricultural Chemicals, September 1955 (pgs. 43–45).